United States Patent [19]
Collins

[11] Patent Number: 6,038,313
[45] Date of Patent: Mar. 14, 2000

[54] DOUBLE SIDED KEYBOARD FOR A TELEPHONE

[75] Inventor: Hugh Mark A. Collins, Nepean, Canada

[73] Assignee: Nortel Networks Corporation, Montreal, Canada

[21] Appl. No.: 08/974,875

[22] Filed: Nov. 20, 1997

[51] Int. Cl.[7] .................................................. H04M 1/00
[52] U.S. Cl. .............................................................. 379/433
[58] Field of Search ..................................... 379/433, 428, 379/434, 88.04; 235/381, 382; 361/777, 778

[56] References Cited

U.S. PATENT DOCUMENTS

| | | | |
|---|---|---|---|
| 5,189,632 | 2/1993 | Ab ........................................ | 346/705.05 |
| 5,564,078 | 10/1996 | Nagai ......................................... | 455/89 |
| 5,584,054 | 12/1996 | Tyneski et al. ............................ | 455/89 |
| 5,652,421 | 7/1997 | Veeneman et al. ....................... | 235/381 |
| 5,764,489 | 6/1998 | Leigh et al. .............................. | 361/777 |
| 5,822,405 | 10/1998 | Astarabadi ............................ | 379/88.04 |

FOREIGN PATENT DOCUMENTS

| | | | |
|---|---|---|---|
| 0164743 | 7/1988 | Japan ..................................... | 379/434 |
| 2146813A | 4/1985 | United Kingdom . | |

*Primary Examiner*—Jack Chiang

[57] ABSTRACT

A portable telephone has a hinged flap with a keyboard on each side of the flap, allowing a user to dial or punch a telephone number when the flap is in the open position or when the flap is in the closed position.

20 Claims, 5 Drawing Sheets

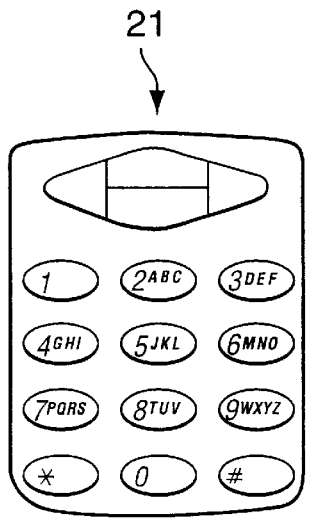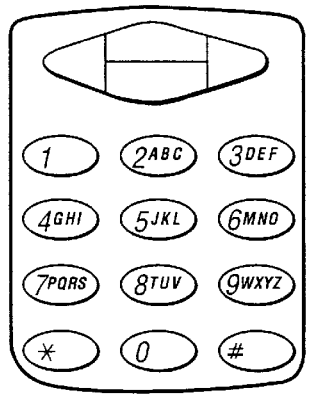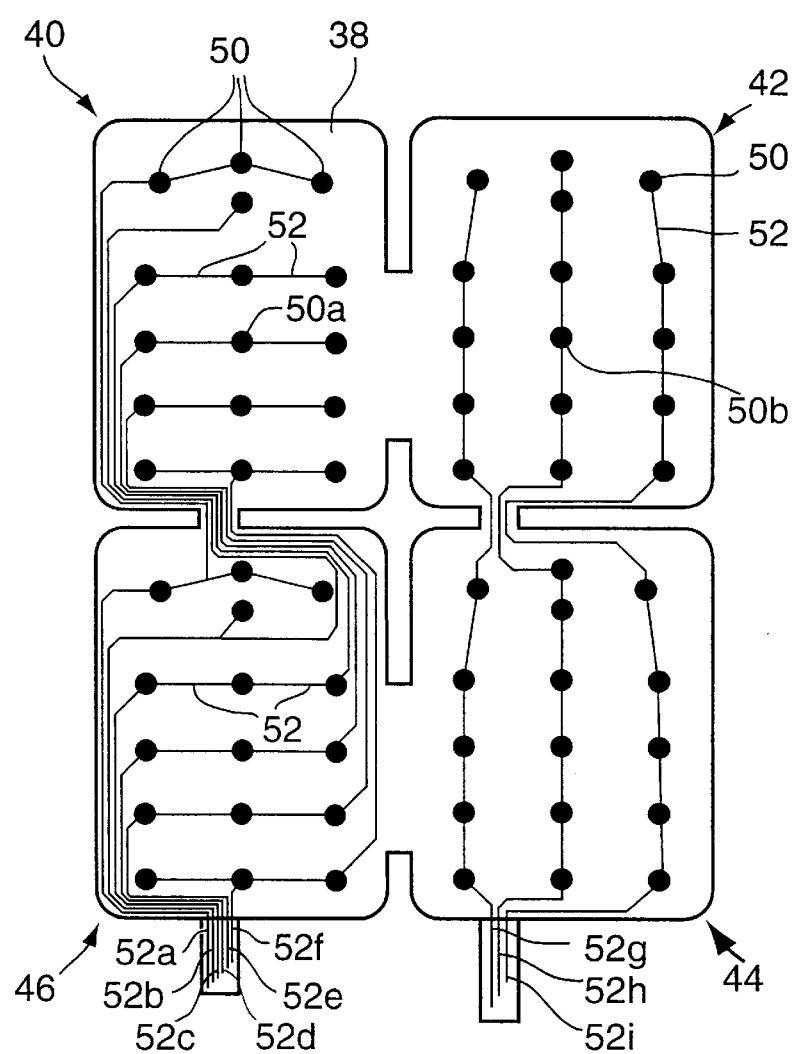
FIG. 2a
FIG. 2b

DOUBLE SIDED KEYBOARD FOR A TELEPHONE

FIELD OF THE INVENTION

The invention relates to keyboards and is particularly concerned with double sided keyboards for use with portable telephones.

BACKGROUND OF THE INVENTION

Various types of keyboards are known for use with portable telephones. For example, U.S. Pat. No. 5,584,054 (inventor: Tyreski), which issued on Dec. 10, 1996, discloses a portable telephone/personal organiser combination, having a flap, with a keyboard on the outer surface of the flap. When the flap is in the closed position, the user can use the keyboard to dial a number and use the telephone. When the flap is in the open position, the keyboard is disabled, and the user can use the personal organizer. It is a disadvantage of the Tyneski device that the user cannot dial a new number when the flap is in the open position.

Similar to the Tyneski device, U.S. Pat. No. 5,189,632 (inventor: Paajanen) which issued on Feb. 23, 1993, discloses a portable telephone/personal computer combination, having a flap, except that the flap has a keyboard on the inside of the flap as well as on the outside. The keyboard on the outside of the flap is a telephone keyboard. The keyboard on the inside of the flap is a standard QUERTY keyboard for use with the personal computer. This patent only contemplates the user dialling a telephone number when the flap is in the closed position. In any event, even if it is possible to use the telephone keyboard to dial a telephone number when the flap is opened, it would likely be awkward. As well, since this device incorporates a personal computer having a complete QUERTY keyboard, the device is larger and therefore more bulky than many current portable, or at least, cellular telephones, as well as having a greater depth dimension. Moreover, the telephone mouthpiece and earpiece on this device are on the edge of the device, resulting in a telephone that is less comfortable to hold than a standard portable telephone and creating a less aesthetically pleasing device than many current portable telephones.

U.S. Pat. No. 5,564,078 (inventor: Nagai), which issued on Oct. 8, 1996, discloses a portable telephone having a flap. In one embodiment, the telephone keyboard is located on the inside surface of the telephone. When the flap is in the closed position, an opening within the flap allows the user access to some, but not all, of the keyboard buttons. In another embodiment, the telephone keyboard is located on the inside surface of the flap. When the flap is in the closed position, an opening within the main body of the telephone allows the user access to some, but not all, of the keyboard buttons. As access to only a few of the keyboard buttons is provided when the flap is in the closed position, a telephone number cannot be dialled unless the flap is opened.

SUMMARY OF THE INVENTION

It is an object of the invention is to obviate or mitigate one or more of the above identified disadvantages.

According to a first broad aspect, the invention provides a portable telephone comprising a body and a flap hinged near a lower edge of the body, the flap having a closed position against the body and an open position, the flap having an outer keyboard on an outer surface of the flap, allowing a user to dial telephone numbers by pressing keys on the outer keyboard when the flap is in the closed position and the flap further having an inner keyboard on an inner surface of the flap, allowing a user to dial telephone numbers by pressing keys on the inner keyboard when the flap is in the open position.

According to another broad aspect, the invention provides a method of manufacturing a portable telephone comprising a body and a flap hinged near a lower edge of the body, the flap having a closed position against the body and an open position, the flap having an outer keyboard on an outer surface of the flap, and the flap further having an inner keyboard on an inner surface of the flap, the steps of providing a flexible substrate having four quadrants, two of the quadrants having a series of rows of conductive tracks and two of the quadrants having a series of columns of conductive tracks, comprise folding the flexible substrate such that one of the quadrants having a series of rows of conductive tracks is folded over one of the quadrants having a series of columns of conductive tracks and the other quadrant having a series of rows of conductive tracks is folded over the other quadrant having a series of columns of conductive tracks; placing a rigid backing layer against a surface of one pair of folded quadrants; folding the flexible substrate wherein one pair of folded quadrants is folded over the other pair of folded quadrants to sandwich the rigid backing layer between the two pairs of folded quadrants; applying the outer keycap material to one side of the folded flexible substrate; and applying the inner keycap material to the other side of the folded flexible substrate thereby constructing the flap.

Advantages of the invention include allowing a user of a portable telephone having a flap to have access to all keys of a telephone keyboard whether the flap is in an open position or a closed position.

BRIEF DESCRIPTION OF THE DRAWINGS

Preferred embodiments of the invention will now be described with reference to the attached drawings in which

FIG. 2a is a view showing the orientation of the two keyboards as they would appear if the flap were split and flattened onto one plane;

FIG. 2b is a front view of a flexible substrate used in the manufacture of the flap;

DETAILED DESCRIPTION OF THE PREFERRED EMBODIMENTS

Figure 1A:
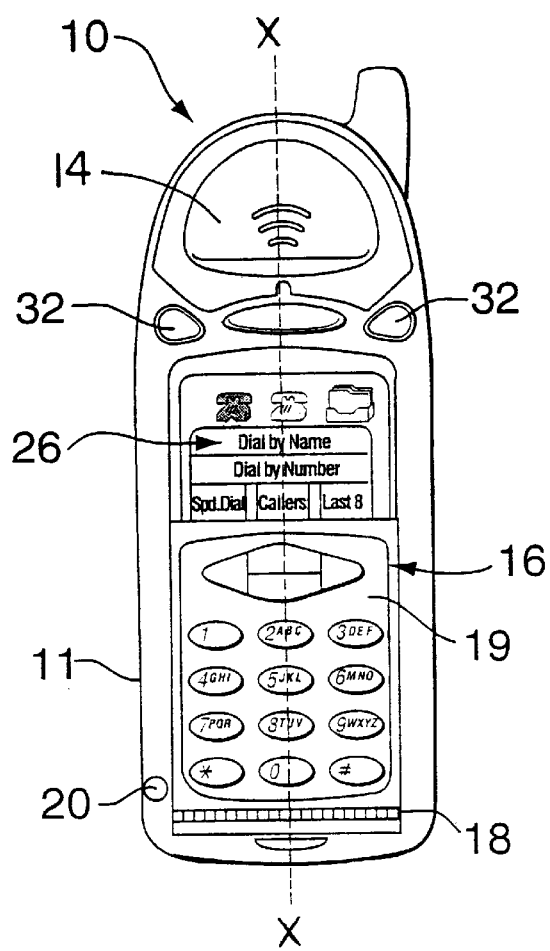
FIG. 1a is a front view of a portable telephone having a flap constructed according to the present invention, with the flap shown in a closed position.
Figure 1B:
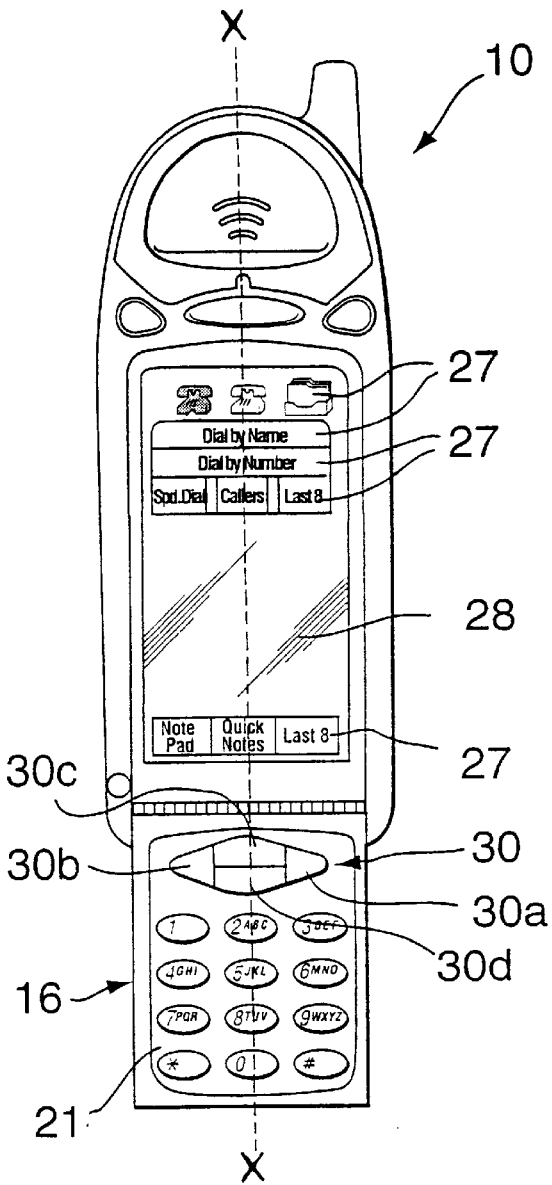
FIG. 1b is a view similar to the view of FIG 1a, except that the flap is in an open position.

Referring to FIG. 1a, there is shown a portable telephone generally designated 10 having a body 11, an antenna 12, an earpiece 14, a flap 16, a flap hinge 18 and a microphone 20. As shown in FIG. 1a, the hinge 18 is preferably located near a bottom edge of the body 11. Preferably, above the closed flap 16, as seen in FIG. 1a, is a portion 26 of a liquid crystal display (LCD), located on the body 11 and providing various options to help the user locate information such as a number stored within the telephone's database (not shown). The display 26 may also have options allowing the user to send or receive facsimile transmissions, for example. FIG. 1b is a view similar to the view of FIG. 1a, except that the flap 16 is in an open position, having moved about hinge 18 from the closed position of FIG. 1a. FIG. 1b shows a display area 28, which was hidden by flap 16 when the flap was in the closed position shown. in FIG. 1a. Although it is preferable for the telephone 10 to incorporate display areas 26, 28, neither area 26 nor area 28 is essential to the broadest aspect of the invention.

As shown in FIGS 1a and 1b, the body 11 of the telephone 10 is elongate with a longitudinal avis x—x, and the earpiece 14 is located near a top edge of the body 11 and the microphone 20 is located near a bottom edge of the body 11. The hinge 18 extends perpendicular to the longitudinal axis x—x of the body 11.

Figure 1C:
FIG. 1c is a side view of the portable telephone on a flat surface with the flap in the open position.

Preferably, as seen in FIG. 1c, the hinge 18 allows the flap to open more than 180 degrees to allow the lower edge of the flap 16 to rest against a surface 17 supporting the telephone 10. Surface 17 could be the surface of a table or the user's wrist or palm, for example.

It will be noted that the flap 16 has two keyboards, one on each side of the flap 16. An outer keyboard 19 is visible when the flap 16 is in the closed position of FIG. 1a and the other keyboard, an inner keyboard 21, is visible when the flap 16 is in the open position of FIG. 1b. Preferably, each keyboard 19, 21 will have the same number and configuration of keys. Each keyboard could certainly have different keys, if desired, but each keyboard would have sufficient keys to permit full telephone dialling.

As indicated above, the telephone preferably has a display area consisting of two portions 26, 28. Portion 26 is visible when the flap 16 is in the closed position, and portions 26 and 28 are visible when the flap 16 is in the open position. The various options, collectively designated 27, as shown in FIG. 1b on the displays 26, 28 (eg: "spd dial", "note pad", "name list", etc), can either be initiated by touching the area of the display 26, 28 over the desired wording or icon if a touch screen is used, or else the scroll keys, generally designated 30 could be used to move around the displays 26, 28 and to select the desired option. For example, if the current option is "caller" as shown on display 26, then by pressing the upwards pointing scroll key 30c, the "dial by number" option will be highlighted. Alternatively, by pressing the leftwards pointing scroll key 30b, the "spd dial" option will be highlighted.

The blank portion of the display 28 can be used to display information produced by an option key 27 such as names and telephone numbers which may be stored in the telephone's directory (not shown). Similarly, the user could handwrite notes on the blank portion of the display 28, using a special pen (not shown) which notes can either be stored in the telephone's storage area (as a bitmap) or else the notes can optionally be sent by facsimile transmission to a desired telephone number using a facsimile transmission option key, for example.

The telephone 10 also optionally includes several additional buttons 32 on the body 11 of the telephone for various functions such as turning the telephone on and off and for increasing or decreasing the volume of the caller's voice through the earpiece, for example.

Since the flap 16 has two separate keyboards, 19, 21, one on each side of the flap 16, two separate sets of keyboard circuitry are required, preferably using flexible substrate key technology, as described below with reference to FIGS. 2a and 2b. FIG. 2b illustrates a flexible substrate 38 divided into quadrants 40–46 which are folded to create circuitry under keyboards 19, 21.

As seen in FIG. 2b, quadrant 40, for example, carries conductive buttons, collectively referred to as 50, and conductive tracks, collectively referred to as 52. Preferably, each button 50 corresponds to a single key on keyboard 21. The buttons 50 are designed to be resiliently depressible, preferably with a force detent so that the user has the sensation of actually pressing the button. The buttons 50 are made of a conductive material, typically incorporating carbon or metal contacts.

As shown in quadrant 40, the buttons 50 are organized in rows, all the buttons 50 in a row being connected by a single conductive track 52. Each row of buttons is connected by a different: conductive track 52. Similarly, considering quadrant 42, the buttons 50 are organized in columns, all the buttons 50 in a column being connected by a single conductive track 52. In the example shown in FIG. 2a, where each keyboard 19 and 21 has the same configuration of buttons, the arrangement of buttons 50 and tracks 52 in quadrants 46 and 44 are essentially the same as those in quadrants 40 and 42, respectively. The conductive tracks 52 are made of highly conductive, low resistance elements such as silver or a silver, carbon combination.

The surface or keycap material of each keyboard 19, 21, and the keys on the keyboards 19, 21 are preferably made of a resiliently flexible material such as an elastomer.

Figures 3A, 3B:
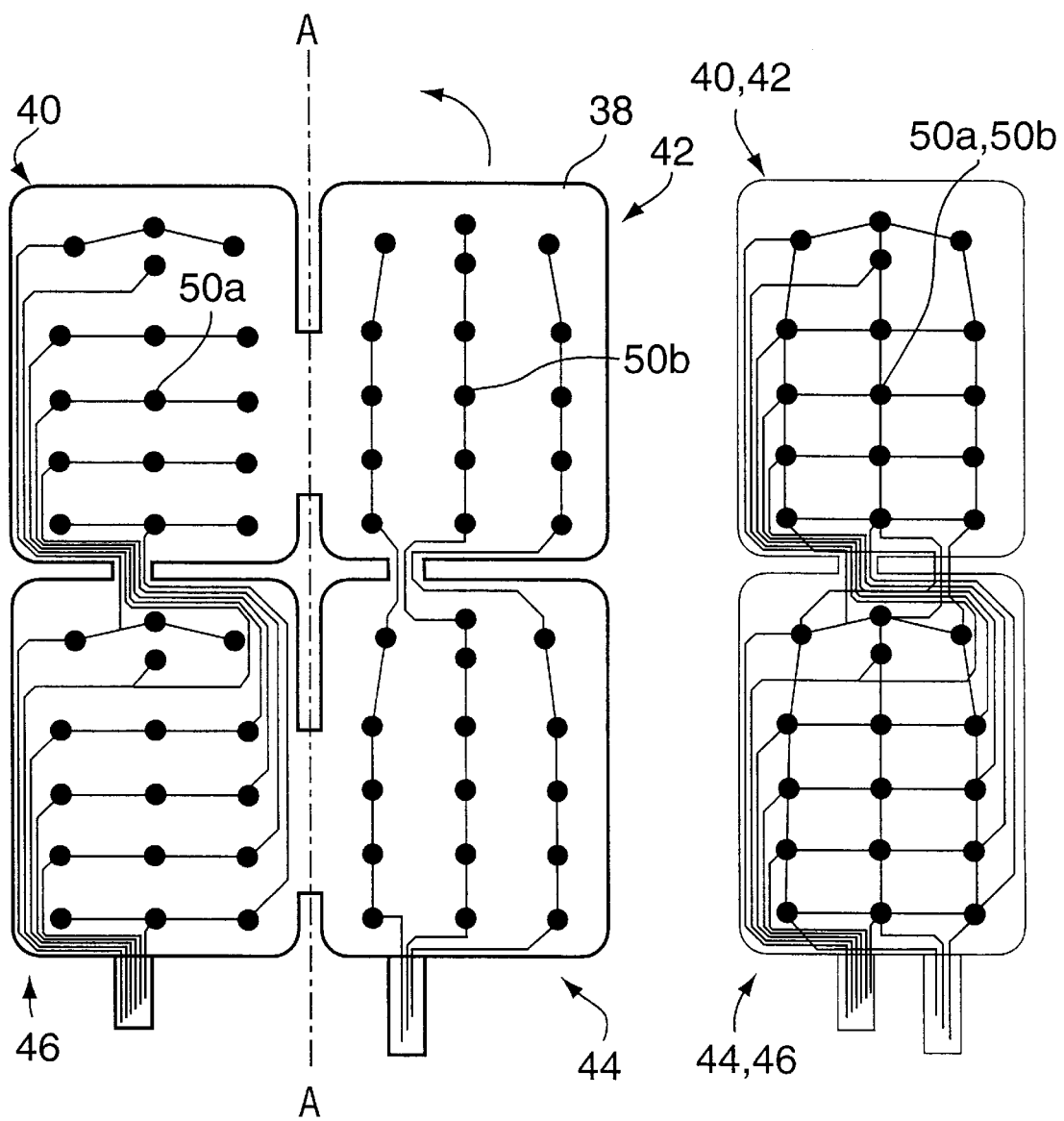
FIGS. 3a–3d illustrate successive steps in the manufacture of the flap.
Figure 3C:
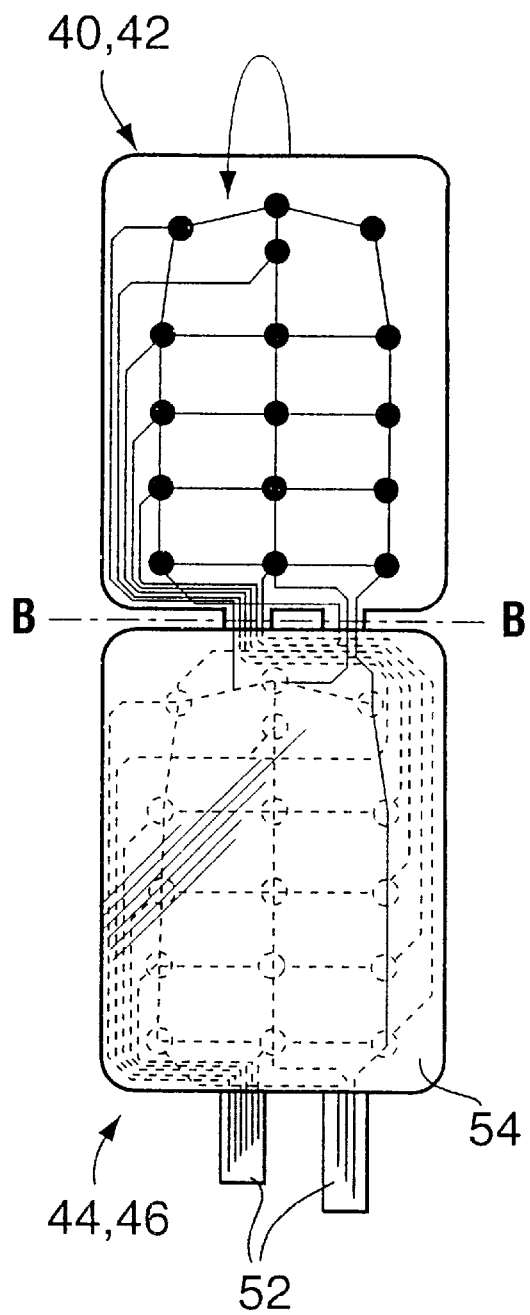

With reference to FIGS. 3a to 3c, the flap is manufactured using the following process steps performed on the flexible substrate 18. First, quadrants 42 and 44 are together folded about line A—A of FIG. 3a, over quadrants 40 and 46, respectively, with the result shown in FIG. 3b. The folded over combination of quadrants 40 and 42 forms first flexible substrate circuitry under keyboard 21 and the folded over combination of quadrants 44 and 46 forms second flexible substrate circuitry under keyboard 19. In order to orient the quadrants to fit within flap 16, the quadrants 40, 42 are then folded over the quadrants 44, 46, along line B—B of FIG. 3c. In order to help ensure the rigidity of the flap 16, and to prevent a key pressed on the inner keyboard 21, for example, from interfering with the tracks relating to the outer keyboard 19, a rigid backing layer 54, typically made of a metal or plastic plate as shown in front view in FIG. 3c, is placed between the quadrants 40, 42 and the quadrants 44, 46 prior to folding the quadrants 40, 42 over the quadrants 44, 46.

Figure 3D:
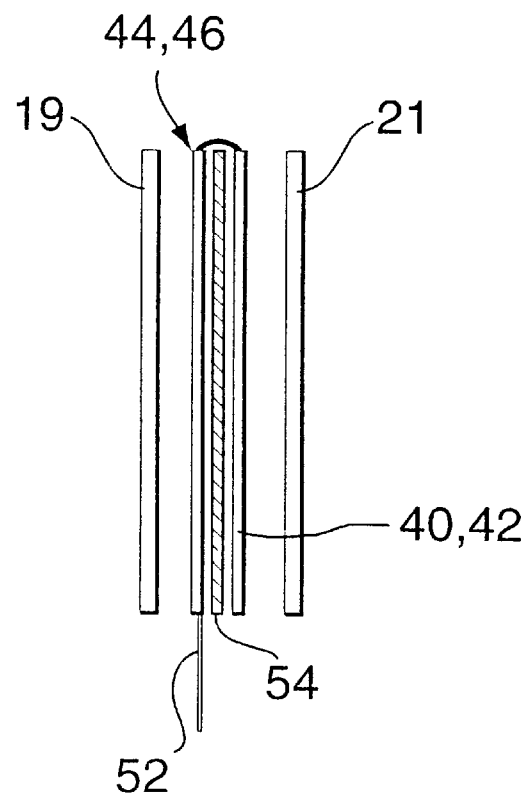

After the quadrants have been folded as described above and the rigid backing layer 54 added, inner keycap material (ie: the material forming the surface of the keyboard) is placed ove: the quadrants 40, 42 to form keyboard 21 and outer keycap material is placed over the quadrants 44, 46 to form keyboard 19, as shown in sectional view in FIG. 3d. The inner keyboard 21 and the outer keyboard 19 are preferably assembled into a unit using adhesives.

As shown in FIGS. 3c and 3d, all of the conductive tracks 52 exit the flap 16 from the lower edge of the outer quadrants 44, 46. Preferably, all of the tracks 52 exit from the flap 16 through the hinge 18 and extend to a power source (not shown) and a microprocessor (not shown).

To use the telephone 10, the user could dial a telephone number when the flap 16 is in the closed position, by using the outer keyboard 19. The user could also choose to open the flap 16 and dial a number using the inner keyboard 21.

An example of the use of the keyboards 19, 21 is considered first with respect to inner keyboard 21, with reference to FIG. 2a and to tracks 52 of FIG. 2b and FIG. 3b.

If the user presses the "5" key on inner keyboard 21, for example, button 50a on quadrant 40 is pressed against button 50b on quadrant 42 creating a short circuit. Accordingly, there is a short circuit of the fourth row from the top of quadrant 40 (ie: track 52d) with the middle column of quadrant 42 (ie: track 52h).

As can be seen by following the tracks on FIG. 2b, the fourth row from the top of quadrant 40 is part of the same track as (ie: is continuous with) the fourth row from the top of quadrant 46 (ie: track 52d). Similarly, the middle column of quadrant 42 is part of the same track as the middle column of quadrant 44 (ie: track 52h). Thus, according to this embodiment, when the "5" key on the inner keyboard 21 is pressed, a short circuit is created along the same two tracks as when the "5" key on the outer keyboard 19 is pressed. More generally, according to this embodiment, pressing a particular key on the inner keyboard 21 causes a short circuit of the same two tracks as pressing the corresponding key on the outer keyboard 19.

The above-noted embodiment of the invention may be modified in many ways. For example, a mechanical switch or a magnetic switch (not shown) could be incorporated within the flap 16 or hinge 18 to determine whether the flap 16 is in the open or closed position. Using a mechanical or magnetic switch, for example, the state of the switch would change from open to closed or vice versa, when the flap 16 is opened, depending upon how the switch is wired. When the flap 16 is open, the outer keyboard 19 could be deactivated to avoid wrong numbers being dialled if the user inadvertently presses a key on the outer keyboard 19.

One method for "deactivating" the outer keyboard makes use of the telephone's microprocessor (not shown) which could determine whether a short circuit relates to a key pressed on the inner keyboard 21 or the outer keyboard 19. For example, the conductive tracks 52 in the inner quadrants 40, 42 could have different resistance than the conductive tracks on the outer quadrants 44, 46. Accordingly, a "5" key, for example, pressed on the inner keyboard 21, could be distinguished from a "5" key pressed on the outer keyboard 19 because the resulting voltage produced by a short circuit on the inner quadrants 40, 42 would be different from the voltage produced by a short circuit on the outer quadrants 44, 46 (the difference in voltage is in direct proportion to the difference in resistance). When the flap 16 is in the open position, for example, the microprocessor would ignore any keys pressed on the outer keyboard 19, by ignoring voltages relating to short circuits of tracks from the outer quadrants 44, 46. This method of key scanning is referred to as analog key scan.

Figure 2C:
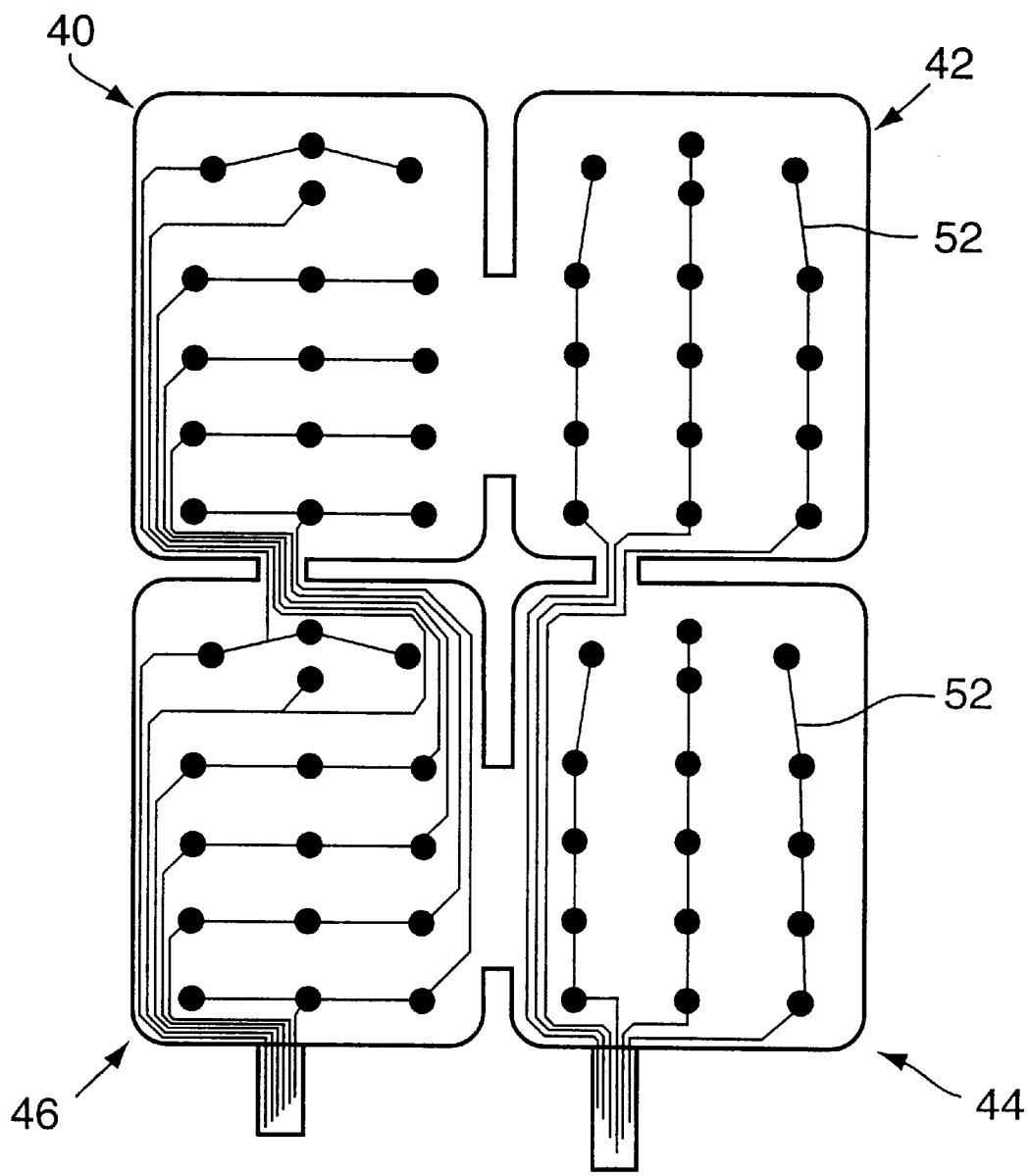
FIG. 2c is a front view of another embodiment of the flexible substrate shown in FIG. 2b used in the manufacture of the flap.

According to another embodiment of the invention, the tracks 52 from the inner keyboard 21 are distinct from (ie: not continuous with) the tracks 52 from the outer keyboard 19. Since the inner keyboard 21 and outer keyboard 19 have separate tracks, the microprocessor can determine whether a short circuit is produced from the inner keyboard 21 or the outer keyboard 19. As a more simple alternative, only one set of tracks 52 needs to be made discontinuous. In other words, only either the rows or columns need to be discontinuous (ie: only either the tracks (columns) from quadrant 42 need to be made discontinuous from the tracks (columns) from quadrant 44 or else the tracks (rows) from quadrant 40 need to be made discontinuous from the tracks (rows) from quadrant 46). An example of a flexible substrate having discontinuous tracks of columns is shown in FIG. 2c, where the tracks 52 from quadrant 42 are not continuous with the tracks 52 from quadrant 44. As above, the microprocessor can then determine whether a short circuit is produced from the inner keyboard 21 or the outer keyboard 19.

Numerous modifications and variations of the present invention are possible in light of the above teachings. It is therefore to be understood that within the scope of the appended claims, the invention may be practised otherwise than as specifically described herein. For example, the flexible keyboard substrate described above could be replaced with a single rigid printed wiring board (not shown), which could, for example, be an FR4 board, and which would eliminate the need for rigid backing plate 54 in the assembly. The rigid printed wiring board would have circuitry on both sides of the board (ie: the circuitry on one side of the board would correspond to one keyboard, and the circuitry on the other side of the board would correspond to the other keyboard). The circuitry would be the same as described above, with a short circuit produced as one track (a row) comes in contact with another track (a column), when a key is pressed on one of the keyboards.

What I claim as my invention is:

1. A portable, handheld telephone comprising a body and a flap, the body being elongate with a longitudinal axis and having a back, a front face, two side edges, a top edge and a bottom edge, an earpiece located on the front face and proximate to the top edge, and a microphone located on the front face and proximate to the bottom edge, the flap being connected to the body by a hinge located proximate to the bottom edge of the body, the hinge extending substantially perpendicular to the longitudinal axis of the body, the flap having a closed position against the front face of the body and an open position in which the flap extends beyond the bottom edge of the body, the flap having an outer keyboard on an outer surface of the flap, allowing a user to dial telephone numbers by pressing keys on the outer keyboard when the flap is in the closed position and the flap further having an inner keyboard on an inner surface of the flap, allowing a user to dial telephone numbers by pressing keys on the inner keyboard when the flap is in the open position.

2. The portable telephone of claim 1, wherein from the closed position, the flap is pivotable substantially 180 degrees to the open position.

3. The portable telephone of claim 1, wherein from the closed position, the flap is pivotable more than 180 degrees to the open position.

4. The portable telephone of claim 1, wherein the telephone further comprises a sensing device for determining when the flap is in the open position or the closed position and when the sensing device determines that the flap is in the open position, the outer keyboard is deactivated.

5. A portable telephone comprising a body and a flap hinged near a lower edge of the body, the flap having a closed position against the body and an open position, the flap having an outer keyboard on an outer surface of the flap, allowing a user to dial telephone numbers by pressing keys on the outer keyboard when the flap is in the closed position and the flap further having an inner keyboard on an inner surface of the flap, allowing a user to dial telephone numbers by pressing keys on the inner keyboard when the flap is in the open position, wherein the flap further comprises first flexible substrate circuitry underlying the inner keyboard, second flexible substrate circuitry underlying the outer keyboard and a rigid backing layer sandwiched between the first and second flexible substrate circuitry.

6. The portable telephone of claim 5, wherein the first flexible substrate circuitry comprises a set of rows of conductive tracks and a set of columns of conductive tracks and the second flexible substrate circuitry comprises a set of rows of conductive tracks and a set of columns of conductive tracks.

7. The portable telephone of claim 5, wherein for most keys on the inner keyboard there is an identical corresponding key on the outer keyboard.

8. The portable telephone of claim 5, wherein the number of keys and configuration of keys on the inner keyboard and outer keyboard are the same.

9. The portable telephone of claim 6, wherein the rows of conductive tracks of the first flexible substrate circuitry are continuous with the rows of conductive tracks of the second flexible substrate circuitry, and the columns of conductive tracks of the first flexible substrate circuitry are continuous with the columns of conductive tracks of the second flexible substrate circuitry.

10. The portable telephone of claim 9, wherein the telephone further comprises a sensing device for determining when the flap is in the open position or the closed position and when the sensing device determines that the flap is in the open position, the outer keyboard is deactivated.

11. The portable telephone of claim 9, wherein the telephone further comprises a means for distinguishing different voltages and wherein the resistance of the conductive tracks of the outer keyboard is different from the resistance of the conductive tracks of the inner keyboard.

12. The portable telephone of claim 6, wherein at least one of the set of rows of conductive tracks of the first flexible substrate circuitry is not continuous with the set of rows of conductive tracks of the second substrate circuitry or the set of columns of conductive tracks of the first flexible substrate circuitry is not continuous with the set of columns of conductive tracks of the second flexible substrate circuitry.

13. The portable telephone of claim 1, wherein the flap further comprises a rigid printed wiring board comprising a first set of circuitry on one side underlying the inner keyboard and a second set of circuitry on the other side underlying the outer keyboard.

14. A portable telephone comprising a body and a flap hinged near a lower edge of the body, the flap having a closed position against the body and an open position, the flap having an outer keyboard on an outer surface of the flap, allowing a user to dial telephone numbers by pressing keys on the outer keyboard when the flap is in the closed position and the flap further having an inner keyboard on an inner surface of the flap, allowing a user to dial telephone numbers by pressing keys on the inner keyboard when the flap is in the open position, wherein the flap further comprises a rigid printed wiring board comprising a first set of circuitry on one side underlying the inner keyboard and a second set of circuitry on the other side underlying the outer keyboard, wherein the first set of circuitry comprises a set of rows of conductive tracks and a set of columns of conductive tracks and the second set of circuitry comprises a set of rows of conductive tracks and a set of columns of conductive tracks.

15. The portable telephone of claim 14, wherein the rows of conductive tracks of the first set of circuitry are continuous with the rows of conductive tracks of the second set of circuitry and the columns of conductive tracks of the first set of circuitry are continuous with the columns of continuous tracks of the second set of circuitry.

16. The portable telephone of claim 14, wherein at least one of the set of rows of conductive tracks of the first set of circuitry is not continuous with the set of rows of conductive tracks of the second set of circuitry or the set of columns of conductive tracks of the first set of circuitry is not continuous with the set of columns of conductive tracks of the second set of circuitry.

17. The portable telephone of claim 1, wherein the telephone has a display screen, the screen being at least partially hidden when the flap is in the closed position and the screen being completely exposed when the flap is in the open position.

18. The portable telephone of claim 17, wherein the display screen comprises a first portion and a second portion, wherein when the flap is in the closed position, only the first portion of the screen is exposed for providing information to the user and wherein when the flap is in the open position, both the first and second portions of the screen are exposed for providing information to the user.

19. The portable telephone of claim 18, wherein the display screen is usable to input information written thereon.

20. In a method of manufacturing a portable telephone comprising a body and a flap hinged near a lower edge of the body, the flap having a closed position against the body and an open position, the flap having an outer keyboard on an outer surface of the flap, and the flap further having an inner keyboard on an inner surface of the flap, the steps of constructing the flap comprise providing a flexible substrate having four quadrants, two of the quadrants having a series of rows of conductive tracks and two of the quadrants having a series of columns of conductive tracks; folding the flexible substrate such that one of the quadrants having a series of rows of conductive tracks is folded over one of the quadrants having a series of columns of conductive tracks and the other quadrant having a series of rows of conductive tracks is folded over the other quadrant having a series of columns of conductive tracks; placing a rigid backing layer against a surface of one pair of folded quadrants; folding the flexible substrate wherein one pair of folded quadrants is folded over the other pair of folded quadrants to sandwich the rigid backing layer between the two pairs of folded quadrants; folding the flexible substrate wherein one pair of folded quadrants is folded over the other pair of folded quadrants to sandwich the rigid backing layer between the two pairs of folded quadrants; applying a keycap material to one side of the folded flexible substrate thereby forming the outer keyboard; and applying a keycap material to the other side of the folded flexible substrate thereby forming the inner keyboard; and securing the inner keyboard to the outer keyboard thereby constructing the flap.

* * * * *